(12) United States Patent
Kang

(10) Patent No.: US 12,427,998 B2
(45) Date of Patent: Sep. 30, 2025

(54) APPARATUS FOR ESTIMATING A BOUNCE SPEED OF A VEHICLE AND A METHOD THEREOF

(71) Applicants: HYUNDAI MOTOR COMPANY, Seoul (KR); KIA CORPORATION, Seoul (KR)

(72) Inventor: Sheen Gil Kang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 317 days.

(21) Appl. No.: 18/104,490

(22) Filed: Feb. 1, 2023

(65) Prior Publication Data

US 2024/0116517 A1   Apr. 11, 2024

(30) Foreign Application Priority Data

Oct. 5, 2022 (KR) .................. 10-2022-0127186

(51) Int. Cl.
*B60W 40/10* (2012.01)
*B60W 40/105* (2012.01)
*B60W 40/107* (2012.01)
(Continued)

(52) U.S. Cl.
CPC ........ *B60W 40/105* (2013.01); *B60W 40/107* (2013.01); *B60W 40/11* (2013.01);
(Continued)

(58) Field of Classification Search
CPC .. B60W 40/105; B60W 40/107; B60W 40/11; B60W 2050/0055;
(Continued)

(56) References Cited

U.S. PATENT DOCUMENTS

2006/0136107 A1* 6/2006 Kim .................. B60G 17/018
280/5.507
2019/0001965 A1* 1/2019 Cho .................. B60W 30/025
(Continued)

FOREIGN PATENT DOCUMENTS

CN   101365599 A * 2/2009 ......... B60G 17/0165
DE   102020211877 A1 * 3/2022 ......... B60G 17/0185
(Continued)

*Primary Examiner* — Mary Cheung
(74) *Attorney, Agent, or Firm* — Lempia Summerfield Katz LLC

(57) ABSTRACT

Disclosed are an apparatus for estimating a bounce speed of a vehicle and a method thereof. The apparatus includes an acceleration sensor that detects an acceleration of the vehicle, a front wheel speed sensor that detects a wheel speed of a front wheel of the vehicle, a rear wheel speed sensor that detects a wheel speed of a rear wheel of the vehicle, and a controller. The controller determines a wheel acceleration of the front wheel based on the wheel speed of the front wheel, determines a wheel acceleration of the rear wheel based on the wheel speed of the rear wheel, and estimates the bounce speed of the vehicle. The bounce speed of the vehicle is estimated based on the acceleration of the vehicle, the wheel acceleration of the front wheel, and the wheel acceleration of the rear wheel.

16 Claims, 9 Drawing Sheets

(51) Int. Cl.
*B60W 40/11* (2012.01)
*B60W 50/00* (2006.01)

(52) U.S. Cl.
CPC .............. *B60W 2050/0055* (2013.01); *B60W 2050/0056* (2013.01); *B60W 2422/70* (2013.01); *B60W 2510/22* (2013.01)

(58) Field of Classification Search
CPC ..... B60W 2050/0056; B60W 2422/70; B60W 2510/22; B60G 17/015; B60G 17/016; B60G 17/018; B60G 17/0182; B60G 17/01908; B60G 17/01933; B60G 2400/10; B60G 2400/20; B60G 2400/206; B60G 2400/208; B60G 2400/25; B60G 2400/602; B60G 2600/604; B60G 2800/70; G01D 1/04; G01D 1/10; G01P 15/001; G01P 15/165
See application file for complete search history.

(56) References Cited

U.S. PATENT DOCUMENTS

2019/0360816 A1* 11/2019 Chen ................... G08G 1/052
2020/0331317 A1 10/2020 Nasu et al.
2022/0017105 A1 1/2022 Nasu et al.

FOREIGN PATENT DOCUMENTS

| JP | H07285311 A | | 10/1995 | |
|----|----|----|----|----|
| JP | 2009006884 A | | 1/2009 | |
| JP | 2013189155 A | * | 9/2013 | ........... B60G 17/016 |
| JP | 2014019335 A | | 2/2014 | |
| KR | 20120002091 A | | 1/2012 | |
| KR | 20160057858 A | | 5/2016 | |
| KR | 20170050300 A | | 5/2017 | |
| KR | 20210089771 A | | 7/2021 | |

* cited by examiner

APPARATUS FOR ESTIMATING A BOUNCE SPEED OF A VEHICLE AND A METHOD THEREOF

CROSS-REFERENCE TO RELATED APPLICATION

This application claims the benefit of and priority to Korean Patent Application No. 10-2022-0127186, filed in the Korean Intellectual Property Office on Oct. 5, 2022, the entire contents of which are incorporated herein by reference.

TECHNICAL FIELD

The present disclosure relates to a technique for estimating a bounce speed of a vehicle based on a wheel speed and acceleration (e.g., a longitudinal acceleration) of the vehicle.

BACKGROUND

In general, when a vehicle hits a bump, a pothole, or the like located on a road surface at a certain speed or higher, the bottom surface of the vehicle may hit the ground and may be scratched or damaged. Alternatively, when a vehicle hits a bump, a pothole, or the like located on a road surface at a certain speed or higher, a safety accident may occur due to that shock and vibration caused by the impact.

A suspension of a vehicle is installed to be connected to an axle and is controlled such that any vibration or impact received from the road surface during operation of the vehicle is not directly transmitted to the vehicle body. Thus, the suspension of a vehicle prevents damage and safety accidents from occurring to the body, passengers, cargo, and the like. Furthermore, the suspension of a vehicle may improve the ride comfort of the vehicle.

Such a suspension, which is called a suspension device, may include a chassis spring that relieves shock from the road surface, a shock absorber that improves riding comfort by controlling the free vibration of the chassis spring, and a stabilizer bar that prevents rolling of the vehicle.

Recently released vehicles are equipped with electronic controlled suspensions (ECS) that automatically adjust the strength of the suspension according to the driving conditions or road conditions.

Such an electronic controlled suspension (ECS) may detect driving state information and road surface information such as a vehicle speed, a steering angle, a vertical acceleration of the vehicle body, and the like through various sensors. The ECS may automatically and electronically control the spring constant of the suspension, the damping force of the shock absorber, the altitude of the vehicle body, and the vehicle height according to the road condition.

The electronic controlled suspension (ECS) includes an active suspension that controls vehicle body movement by applying external energy to the suspension using an actuator. Additionally, the ECS includes a semi-active suspension that uses an actuator as an auxiliary spring to adjust damping force.

A conventional ECS is required to separately include a vertical acceleration sensor and a suspension stroke sensor (i.e., a vehicle height sensor) to detect a vehicle bounce speed.

The matters described in this background section are intended to promote an understanding of the background of the disclosure and may include matters that are not already known to those having ordinary skill in the art.

SUMMARY

The present disclosure has been made to solve the above-mentioned problems occurring in the prior art while advantages achieved by the prior art are maintained intact.

An aspect of the present disclosure provides an apparatus and method for estimating a bounce speed of a vehicle capable of measuring wheel speeds of the front and rear wheels of the vehicle. The apparatus and method for estimating a bounce speed of a vehicle is further capable of measuring an acceleration of the vehicle by using wheel speed sensors and acceleration sensors provided in the vehicle, and determining a wheel acceleration of the front wheel based on the wheel speed of the front wheel. The apparatus and method for estimating a bounce speed of a vehicle is further capable of determining a wheel acceleration of the rear wheel based on the wheel speed of the rear wheel, and estimating a bounce speed of the vehicle. The bounce speed of the vehicle is estimated based on the wheel acceleration of the front wheels, the wheel acceleration of the rear wheels, and the acceleration of the vehicle. Thus, it is possible to estimate the bounce speed of the vehicle without additionally equipping the vehicle with a vertical direction acceleration sensor and a suspension stroke sensor (i.e., a height sensor).

The technical problems to be solved by the present disclosure are not limited to the aforementioned problems, and any other technical problems not mentioned herein should be clearly understood from the following description by those having ordinary skill in the art to which the present disclosure pertains. Also, it may be easily understood that the objects and advantages of the present disclosure may be realized by the units and combinations thereof recited in the claims.

According to an aspect of the present disclosure, an apparatus for estimating a bounce speed of a vehicle includes an acceleration sensor that detects an acceleration of the vehicle, a front wheel speed sensor that detects a wheel speed of a front wheel of the vehicle, and a rear wheel speed sensor that detects a wheel speed of a rear wheel of the vehicle. The apparatus for estimating a bounce speed of a vehicle further includes a controller that determines a wheel acceleration of the front wheel based on the wheel speed of the front wheel, determines a wheel acceleration of the rear wheel based on the wheel speed of the rear wheel, and estimates the bounce speed of the vehicle. The bounce speed of the vehicle is estimated based on the acceleration of the vehicle, the wheel acceleration of the front wheel, and the wheel acceleration of the rear wheel.

According to an embodiment, the controller may determine a stroke change rate of a rear wheel suspension, a stroke change amount of the rear wheel suspension, and a pitch speed of the vehicle based on the acceleration of the vehicle, the wheel acceleration of the front wheel, and the wheel acceleration of the rear wheel. The controller may further estimate the bounce speed of the vehicle by summing the stroke change rate of the rear wheel suspension, the stroke change amount of the rear wheel suspension, and the pitch speed of the vehicle.

According to an embodiment, the controller may estimate the bounce speed of the vehicle when the vehicle moves over a speed bump.

According to an embodiment, the controller may include a first differentiator that differentiates the front wheel speed input from the front wheel speed sensor to output the wheel acceleration of the front wheel, and a first subtractor that subtracts the acceleration of the vehicle from the wheel acceleration of the front wheel to output a rate of change of a distance a center of the front wheel moves in a horizontal direction with respect to time. The controller may further include a first multiplier that multiplies an output of the first subtractor by a first constant, and a second differentiator that differentiates the wheel speed of the rear wheel input from the rear wheel speed sensor to output the wheel acceleration of the rear wheel. Furthermore, the controller may include a second subtractor that subtracts the acceleration of the vehicle from the wheel acceleration of the rear wheel to output a rate of change of a distance a center of the rear wheel moves in the horizontal direction with respect to time. Additionally, the controller may include a third subtractor that subtracts the rate of change of the distance the center of the front wheel moves in the horizontal direction with respect to time from the rate of change of the distance the center of the rear wheel moves in the horizontal direction with respect to time. The controller may also include a first integrator that integrates an output of the third subtractor with respect to time, and a second multiplier that multiplies an output of the first integrator by a second constant. The controller also includes: a second integrator that integrates an output of the first integrator again with respect to time; a third multiplier that multiplies an output of the second integrator by a third constant; and a summer that sums an output of the first multiplier, an output of the second multiplier, and an output of the third multiplier.

According to an embodiment, the controller may further include a first band pass filter (BPF) located between the first subtractor and the first multiplier to remove a noise and a direct current (DC) offset included in the output of the first subtract. The controller may also include a second BPF located between the third subtractor and the first integrator to remove a noise and a DC offset included in the output of the third subtractor.

According to an embodiment, the controller may further include a band pass filter (BPF) that removes a noise and a DC offset included in an output of the summer.

According to an embodiment, the controller may further include a first low pass filter (LPF) that primarily removes a noise and a DC offset included in the output of the first subtractor, and a high pass filter (HPF) that secondarily removes a noise and a DC offset included in an output of the first LPF. Additionally, the controller may include a second LPF that primarily removes a noise and a DC offset included in the output of the third subtractor, and an HPF that secondarily removes a noise and a DC offset included in an output of the second LPF.

According to an embodiment, the controller may further include a first low pass filter (LPF) that primarily removes a noise and a DC offset included in the output of the first subtractor, a first average filter that outputs an average of outputs of the first LPF, and a fourth subtractor that subtracts an output of the first average filter from an output of the first LPF. The controller further includes a second LPF that primarily removes a noise and a DC offset included in the output of the third subtractor, a second average filter that outputs an average of outputs of the second LPF, and a fifth subtractor that subtracts an output of the second average filter from an output of the second LPF.

According to another aspect of the present disclosure, a method of estimating a bounce speed of a vehicle includes: detecting, by an acceleration sensor, an acceleration of the vehicle; detecting, by a front wheel speed sensor, a wheel speed of a front wheel of the vehicle; and detecting, by a rear wheel speed sensor, a wheel speed of a rear wheel of the vehicle. The method further includes: determining, by a controller, a wheel acceleration of the front wheel based on the wheel speed of the front wheel; determining a wheel acceleration of the rear wheel based on the wheel speed of the rear wheel; and estimating the bounce speed of the vehicle. The bounce speed of the vehicle is estimated based on the acceleration of the vehicle, the wheel acceleration of the front wheel, and the wheel acceleration of the rear wheel.

According to an embodiment, the estimating of the bounce speed may include determining a stroke change rate of a rear wheel suspension, a stroke change amount of the rear wheel suspension, and a pitch speed of the vehicle. The pitch speed of the vehicle is based on the acceleration of the vehicle, the wheel acceleration of the front wheel, and the wheel acceleration of the rear wheel. The estimating of the bounce speed may further include estimating the bounce speed of the vehicle by summing the stroke change rate of the rear wheel suspension, the stroke change amount of the rear wheel suspension, and the pitch speed of the vehicle.

According to an embodiment, the estimating of the bounce speed may include initiating an estimate of the bounce speed of the vehicle when the vehicle moves over a speed bump.

According to an embodiment, the estimating of the bounce speed may include differentiating, by a first differentiator, the front wheel speed input from the front wheel speed sensor to output the wheel acceleration of the front wheel. The estimating of the bounce speed may further include subtracting, by a first subtractor, the acceleration of the vehicle from the wheel acceleration of the front wheel to output a rate of change of a distance a center of the front wheel moves in a horizontal direction with respect to time. The estimating of the bounce speed may additionally include: multiplying, by a first multiplier, an output of the first subtractor by a first constant; differentiating, by a second differentiator, the wheel speed of the rear wheel input from the rear wheel speed sensor to output the wheel acceleration of the rear wheel; and subtracting, by a second subtractor, the acceleration of the vehicle from the wheel acceleration of the rear wheel to output a rate of change of a distance a center of the rear wheel moves in the horizontal direction with respect to time. Furthermore, the estimating of the bounce speed may include subtracting, by a third subtractor, the rate of change of the distance the center of the front wheel moves in the horizontal direction with respect to time from the rate of change of the distance the center of the rear wheel moves in the horizontal direction with respect to time. Additionally, the estimating of the bounce speed may include: integrating, by a first integrator, an output of the third subtractor with respect to time; multiplying, by a second multiplier, an output of the first integrator by a second constant; integrating, by a second integrator, an output of the first integrator again with respect to time; multiplying, by a third multiplier, an output of the second integrator by a third constant; and summing, by a summer, an output of the first multiplier, an output of the second multiplier and an output of the third multiplier.

According to an embodiment, the estimating of the bounce speed may further include removing, by a first band pass filter (BPF), a noise and a DC offset included in an output of the first subtractor. Furthermore, the estimating of the bounce speed may include removing, by a second BPF, a noise and a DC offset included in an output of the third subtractor.

According to an embodiment, the estimating of the bounce speed may further include removing, by a band pass filter (BPF), a noise and a DC offset included in the output of the summer.

According to an embodiment, the estimating of the bounce speed may further include: primarily removing, by a first low pass filter (LPF), a noise and a DC offset included in the output of the first subtractor; and secondarily removing, by a first a high pass filter (HPF), a noise and a DC offset included in an output of the first LPF. Furthermore, the estimating of the bounce speed may include: primarily removing, by a second LPF, a noise and a DC offset included in the output of the third subtractor; and secondarily removing, by a second HPF, a noise and a DC offset included in an output of the second LPF.

According to an embodiment, the estimating of the bounce speed may further include: primarily removing, by a first low pass filter (BPF), a noise and a DC offset included in the output of the first subtractor; outputting, by a first average filter, an average of outputs of the first LPF; and subtracting, by a fourth subtractor, an output of the first average filter from an output of the first LPF. The estimating of the bounce speed may further include: primarily removing, by a second LPF, a noise and a DC offset included in the output of the third subtractor; outputting, by a second average filter, an average of outputs of the second LPF; and subtracting, by a fifth subtractor, an output of the second average filter from the output of the second LPF.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
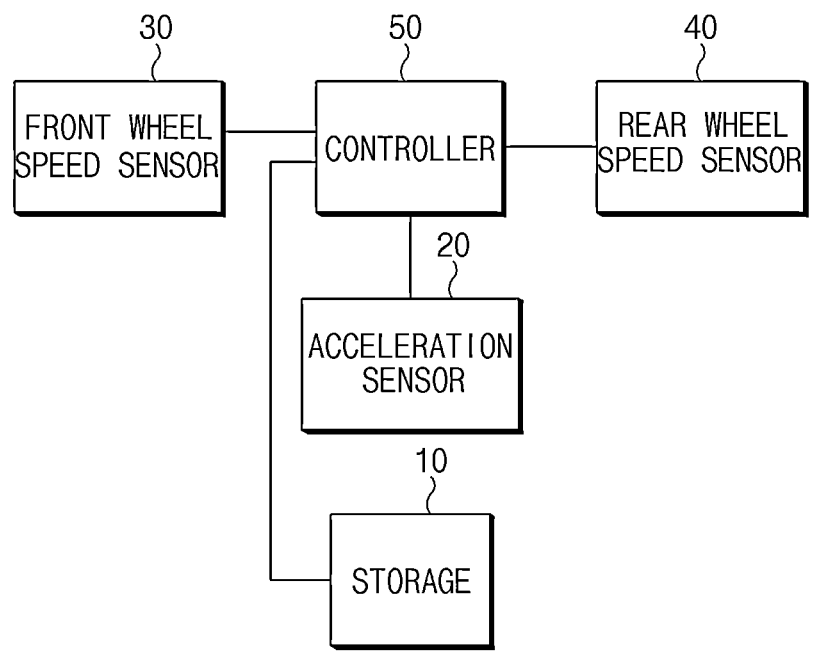
FIG. 1 is a block diagram illustrating an apparatus for estimating a bounce speed of a vehicle according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function has been omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or to perform that operation or function.

In the present disclosure, the bounce speed of a vehicle means a result (value) obtained by differentiating a distance in which the center of gravity of the vehicle moves in the vertical direction with time.

FIG. 1 is a block diagram illustrating an apparatus for estimating a bounce speed of a vehicle according to an embodiment of the present disclosure.

As shown in FIG. 1, an apparatus for estimating a bounce speed of a vehicle according to an embodiment of the present disclosure may include a storage 10, an acceleration sensor 20, a front wheel speed sensor 30, a rear wheel speed sensor 40, and a controller 50. In this case, depending on a scheme of implementing an apparatus for estimating a bounce speed of a vehicle according to an embodiment of the present disclosure, components may be combined with each other to be implemented as one, or some components may be omitted.

Regarding each component, the storage 10 may store various logic, algorithms, and programs required in the processes of: detecting the acceleration of the vehicle through the acceleration sensor 20 provided in the vehicle; detecting the wheel speed of the front wheel through the front wheel speed sensor 30; detecting the wheel speed of the rear wheel through the rear wheel speed sensor 40; determining the wheel acceleration of the front wheel based on the wheel speed of the front wheel; determining the wheel acceleration of the rear wheel based on the wheel speed of the rear wheel; and estimating the bounce speed of the vehicle. The bounce speed of the vehicle is estimated based on the acceleration of the vehicle, the wheel acceleration of the front wheels, and the wheel acceleration of the rear wheels.

The storage 10 may include at least one type of a storage medium of memories of a flash memory type, a hard disk type, a micro type, a card type (e.g., a secure digital (SD) card or an extreme digital (XD) card), and the like. The storage 10 may also include at least one of a volatile memory such as a random access memory (RAM), a static RAM, a read-only memory (ROM), a programmable ROM (PROM), an electrically erasable PROM (EEPROM), a magnetic memory (MRAM), a magnetic disk, an optical disk type memory, and the like.

The acceleration sensor 20 may detect the longitudinal acceleration acting on the center of gravity of the vehicle.

The front wheel speed sensor 30 may be mounted on the front wheel of the vehicle to detect the wheel speed (rotational speed of the wheel) of the front wheel.

The rear wheel speed sensor 40 may be mounted on the rear wheel of the vehicle to detect the wheel speed of the rear wheel.

The controller 50 may perform overall control such that each component performs its function. The controller 50 may be implemented in the form of hardware or software, or may be implemented in a combination of hardware and software. The controller 50 may be implemented as a microprocessor, but is not limited thereto.

Specifically, the controller 50 may perform various controls required in the processes of: detecting the acceleration of the vehicle through the acceleration sensor 20 provided in the vehicle; detecting the wheel speed of the front wheel through the front wheel speed sensor 30; detecting the wheel speed of the rear wheel through the rear wheel speed sensor 40; determining the wheel acceleration of the front wheel based on the wheel speed of the front wheel; determining the wheel acceleration of the rear wheel based on the wheel speed of the rear wheel; and estimating the bounce speed of the vehicle. The bounce speed of the vehicle may be estimated based on the acceleration of the vehicle, the wheel acceleration of the front wheels, and the wheel acceleration of the rear wheels.

For example, the controller 50 may estimate the bounce speed $\dot{z}_b$ of the vehicle based on Equation 1 below.

$$\dot{z}_b = \frac{1}{s}\left\{\left(c_1 + \frac{c_2}{s}\right)(\delta \dot{x}_{wr} - \delta \dot{x}_{wf}) + c_3 s \delta \dot{x}_{wf}\right\} = \frac{1}{s}c_1(\delta \dot{x}_{wr} - \delta \dot{x}_{wf}) + \frac{1}{s^2}c_2(\delta \dot{x}_{wr} - \delta \dot{x}_{wf}) + c_3 \delta \dot{x}_{wf}$$ [Equation 1]

In Equation 1, 1/s means integration over time; $C_1$, $C_2$, and $C_3$, mean constants, respectively; $\delta \dot{x}_{wf}$ means the rate of change of the distance the center of the front wheel (rotation axis) moves in the horizontal direction with respect to time; and $\delta \dot{x}_{wr}$ represents the rate of change with respect to time of the horizontally moved distance of the center of rotation (axis) of the rear wheel. In this case, s means '1/time' as a Laplace transform.

In addition, in Equation 1, the first term on the right side means the stroke change rate of the rear wheel suspension, the second term means the stroke change amount of the rear wheel suspension, and the third term means the pitch speed of the vehicle. In this case, the suspension stroke refers to a moving distance of a wheel from a full bump, where the wheel is pushed up and contracted to the maximum, to a full rebound, which is fully extended.

Hereinafter, a process in which the controller 50 derives Equation 1 is described in detail with reference to FIG. 2.

Figure 2:
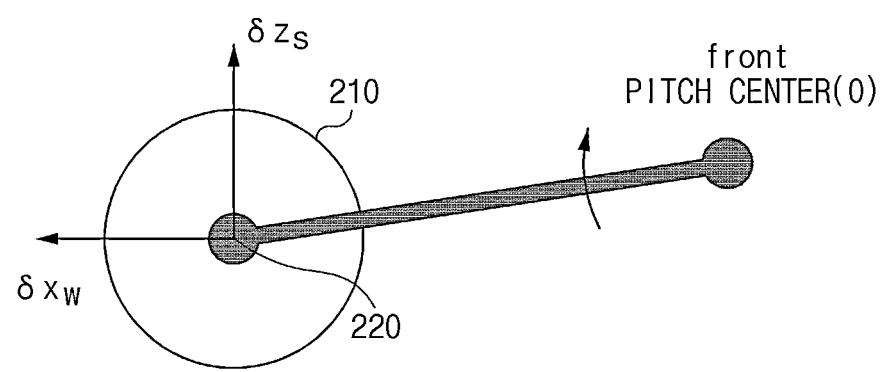
FIG. 2 is a diagram illustrating a correlation between a wheel speed, a pitch, and a bounce motion of a vehicle used in a process in which a controller provided in an apparatus for estimating a bounce speed of a vehicle derives Equation 1, according to an embodiment of the present disclosure.

FIG. 2 is a diagram illustrating a correlation between a wheel speed, a pitch, and a bounce motion of a vehicle used in a process in which a controller provided in an apparatus for estimating the bounce speed of a vehicle derives Equation 1 according to an embodiment of the present disclosure.

In FIG. 2, reference numeral 210 represents a wheel, reference numeral 220 represents the center (axis of rotation) of a wheel 210, $\delta x_w$ represents the distance the center 220 of the wheel 210 moves in the horizontal direction, and $\delta z_s$ represents the distance the center 220 moves in the vertical direction (up and down direction).

When a vehicle moves over an obstacle (e.g., a speed bump), the vehicle body and the wheel 210 rotate around the instantaneous rotation center of the front wheel suspension as an axis. In this case, the vertical movement amount (movement distance) and the horizontal movement amount of the wheel center 220 have a relationship as shown in Equation 2 below due to the characteristics of the suspension.

$$\eta_f = \frac{\partial x_{wf}}{\partial z_{sf}}, \eta_r = -\frac{\partial x_{wr}}{\partial z_{sr}}$$ [Equation 2]

In Equation 2, $\eta_f$ represents the horizontal movement amount compared to the vertical movement amount of the front wheel center. Furthermore, in Equation 2, $\eta_r$ represents the horizontal movement amount compared to the vertical movement amount of the rear wheel center.

In addition, the center 220 of the wheel 210 rotates in proportion to the pitch motion of the vehicle. When this is integrated with Equation 2, it may be expressed as following Equation 3.

$$\delta \dot{x}_{wf} = \dot{v}_{wf} - a_x = -\eta_0 \dot{\theta} - \eta_f \dot{z}_{sf}$$

$$\delta \dot{x}_{wr} = \dot{v}_{wr} - a_x = -\eta_0 \dot{\theta} + \eta_r \dot{z}_{sr}$$ [Equation 3]

In Equation 3 $\delta \dot{x}_{wf}$ represents the rate of change of the distance that the center of the front wheel moves in the horizontal direction with respect to time, $\dot{v}_{wf}$ represents the wheel acceleration of the front wheel, and $a_x$ represents the longitudinal acceleration of the vehicle. Furthermore, in Equation 3, $\eta_0$ represents the amount of horizontal movement of the center of the front wheel compared to the pitch (pitch amount) of the vehicle, and $\dot{\theta}$ represents the pitch rate of the vehicle body. Furthermore, in Equation 3, $\dot{z}_{sf}$ represents the result of differentiating the distance the center of the front wheel moves in the vertical direction (up and down direction) by time.

In addition, $\delta \dot{x}_{wr}$ represents the rate of change of the distance the center of the rear wheel moves in the horizontal direction with respect to time, and $\dot{v}_{wr}$ represents the wheel acceleration of the rear wheel. Furthermore, in Equation 3, $\dot{z}_{sr}$ represents the result of differentiating the distance the center of the rear wheel moves in the vertical direction (up and down direction) by time.

In general, because the instantaneous rotation center of the rear wheel suspension is very short compared to the instantaneous rotation center of the front wheel suspension when the vehicle moves over a speed bump, $\eta_f$ may be assumed to be a value close to 0 (zero). In other words, because the amount of horizontal movement compared to the vertical movement of the front wheel center is very small, $\eta_f$ may be assumed to be a value close to 0 (zero). Therefore, it may be expressed as in following Equation 4.

$$\dot{\theta} = -\frac{1}{\eta_0}\delta\dot{x}_{wf} \qquad \text{[Equation 4]}$$

$$\dot{z}_{sr} = \frac{\delta\dot{x}_{wr} - \delta\dot{x}_{wf}}{\eta_r}$$

The force (Fzr) for supporting the vehicle body by the rear wheel suspension and the force $F_{zf}$ for supporting the vehicle body by the front wheel suspension may be expressed as following Equation 5.

$$F_{zr} = \left(C_r + \frac{K_r}{s}\right)\dot{z}_{sr} \qquad \text{[Equation 5]}$$

$$F_{zf} = \frac{1}{l_f}(l_r F_{zr} - I\ddot{\theta})$$

In Equation 5, $C_r$ represents the damping coefficient of a rear wheel suspension damper, $K_r$ represents the rear wheel suspension spring coefficient, and 1/s represents the integral by time. Furthermore, in Equation 5, $l_f$ represents the distance from the center of gravity of the vehicle to the front wheel axle, and $l_r$ represents the distance from the center of gravity of the vehicle to the rear wheel axle. Additionally, in Equation 5, I represents the pitch inertia moment of the vehicle, and $\ddot{\theta}$ represents the result of differentiating the pitch rate of the vehicle body by time.

The bounce acceleration $\ddot{z}_b$ of the vehicle derived from Equation 4 and Equation 5 may be expressed as in following Equation 6.

$$\ddot{z}_b = \frac{F_{zr} + F_{zf}}{m} = \frac{1}{m}\left\{\frac{l}{l_f}\left(C_r + \frac{K_r}{s}\right)\frac{\delta\dot{x}_{wr} - \delta\dot{x}_{wf}}{\eta_r} - \frac{l}{l_f}\ddot{\theta}\right\} \qquad \text{[Equation 6]}$$

In Equation 6, m means the weight (unoccupied weight) of the vehicle, and l means the wheelbase.

When the constants of Equation 6 are arranged, it may be expressed as following Equation 7.

$$\ddot{z}_b = \left(c_1 + \frac{c_2}{s}\right)(\delta\dot{x}_{wr} - \delta\dot{x}_{wf}) + c_3 s \delta\dot{x}_{wf} \qquad \text{[Equation 7]}$$

In Equation 7, $C_1$, $C_2$, and $C_3$ represent constants, respectively.

Eventually, when the bounce acceleration $\ddot{z}_b$ of the vehicle expressed as Equation 7 is integrated with respect to time, the bounce speed $\dot{z}_b$ of the vehicle may be obtained as Equation 1.

Figure 3:
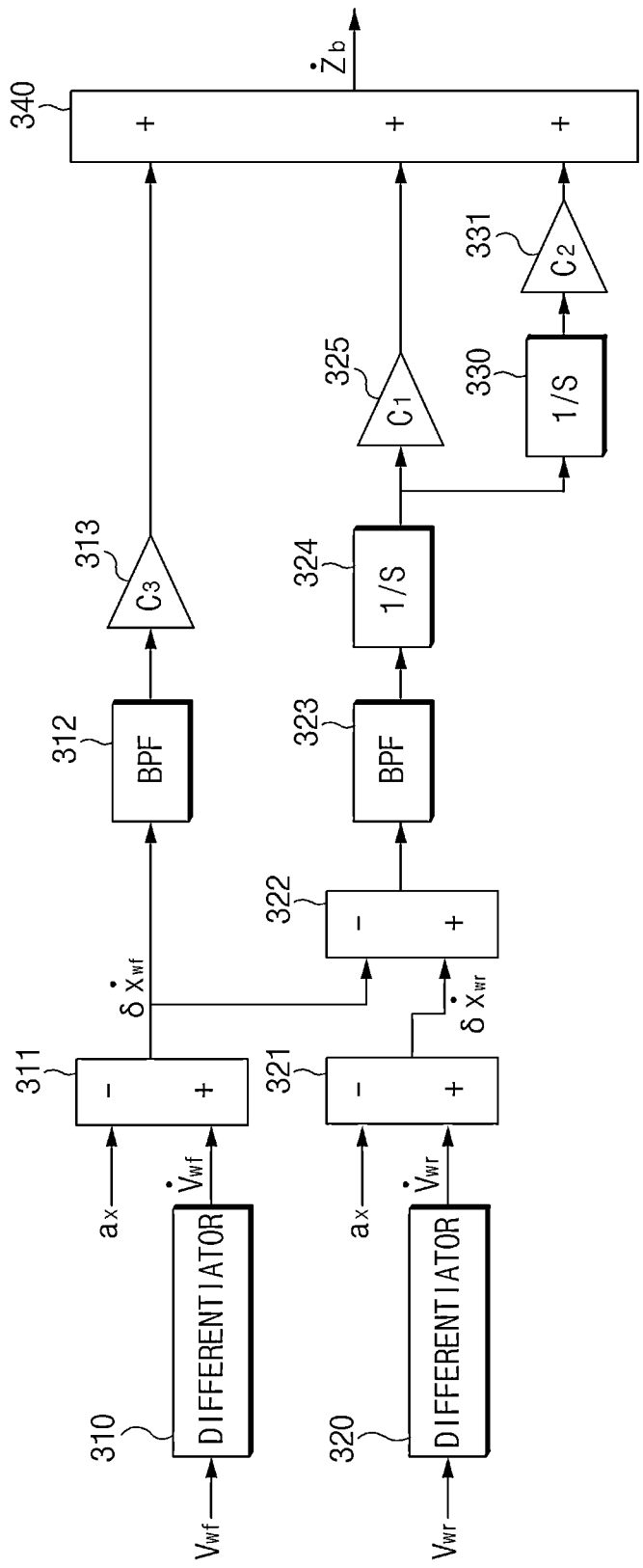
FIG. 3 is a first diagram illustrating a detailed configuration of a controller provided in an apparatus for estimating a bounce speed of a vehicle according to an embodiment of the present disclosure.

FIG. 3 is a first diagram illustrating a detailed configuration of a controller provided in an apparatus for estimating a bounce speed of a vehicle according to an embodiment of the present disclosure. An example of a hardware configuration for estimating a bounce speed of a vehicle is described, but may be implemented as software logic for estimating a bounce speed of a vehicle.

As shown in FIG. 3, the controller 50, provided in an apparatus for estimating a bounce speed of a vehicle according to an embodiment of the present disclosure, may include a first differentiator 310, a first subtractor 311, a first band pass filter (BPF) 312, a first multiplier 313, and a second differentiator 320. The controller 50 may also include a second subtractor 321, a third subtractor 322, a second BPF 323, a first integrator 324, a second multiplier 325, a second integrator 330, a third multiplier 331, and a summer 340.

First, the first differentiator 310 differentiates the wheel speed $v_{wf}$ of the front wheel input from the front wheel speed sensor 30 to output the wheel acceleration $\dot{v}_{wf}$ of the front wheel.

The first subtractor 311 subtracts the acceleration $a_x$ of the vehicle from the wheel acceleration of the front wheel to output a rate of change $\delta\dot{x}_{wf}$ of a distance the center of the front wheel moves in the horizontal direction with respect to time.

The first BPF 312 removes a noise (e.g., tire vibration) and a direct current (DC) offset included in the rate of change of the distance the center of the front wheel moves in the horizontal direction with respect to time.

The first multiplier 313 multiplies the rate of change of the distance the center of the front wheel moves in the horizontal direction with respect to time from which the noise and DC offset are removed by the constant $C_3$.

The second differentiator 320 differentiates the wheel speed $v_{wr}$ of the rear wheel input from the rear wheel speed sensor to output the wheel acceleration $\dot{v}_{wr}$ of the rear wheel.

The second subtractor 321 subtracts the acceleration $a_x$ of the vehicle from the wheel acceleration of the rear wheel to output a rate of change $\delta\dot{x}_{wr}$ of a distance the center of the rear wheel moves in the horizontal direction with respect to time.

The third subtractor 322 subtracts the rate of change of the distance that the center of the front wheel moves in the horizontal direction with respect to time from the rate of change of the distance that the center of the rear wheel moves in the horizontal direction with respect to time.

The second BPF 323 removes a noise (e.g., tire vibration) and a DC offset included in the result of subtracting the rate of change of the distance that the center of the front wheel moves in the horizontal direction with respect to time from the rate of change of the distance that the center of the rear wheel moves in the horizontal direction with respect to time.

The first integrator 324 integrates the output of the second BPF 323 with respect to time.

The second multiplier 325 multiplies the output of the first integrator 324 by the constant $C_1$.

The second integrator 330 integrates the output of the first integrator 324 again with respect to time.

The third multiplier 331 multiplies the output of the second integrator 330 by the constant $C_2$.

The summer 340 sums the output of the first multiplier 313, the output of the second multiplier 325, and the output of the third multiplier 331.

Figure 4:
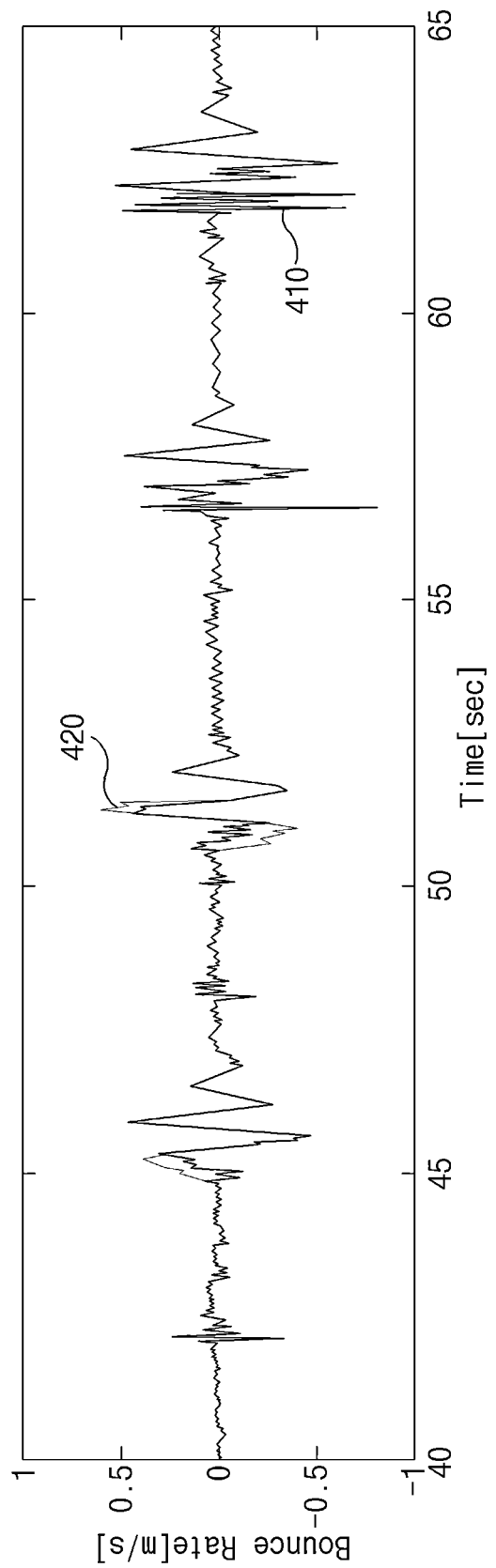
FIG. 4 is a diagram illustrating a performance analysis of an apparatus for estimating a bounce speed of a vehicle according to an embodiment of the present disclosure.

FIG. 4 is a diagram illustrating a performance analysis of an apparatus for estimating a bounce speed of a vehicle according to an embodiment of the present disclosure. FIG. 4 also illustrates a bounce rate when the vehicle successively crosses four speed bumps.

In FIG. 4, reference numeral 410 represents an actually measured bounce rate. Furthermore, reference numeral 420 represents a bounce rate estimated by an apparatus for estimating a bounce speed of a vehicle according to an embodiment of the present disclosure.

As shown in FIG. 4, because the difference between the bounce rate 420 estimated by an apparatus for estimating a bounce speed of a vehicle according to an embodiment of the present disclosure and the actually measured bounce rate 410 is insignificant, it may be understood that the performance of an apparatus for estimating a bounce speed of a vehicle according to an embodiment of the present disclosure is excellent.

Figure 5:
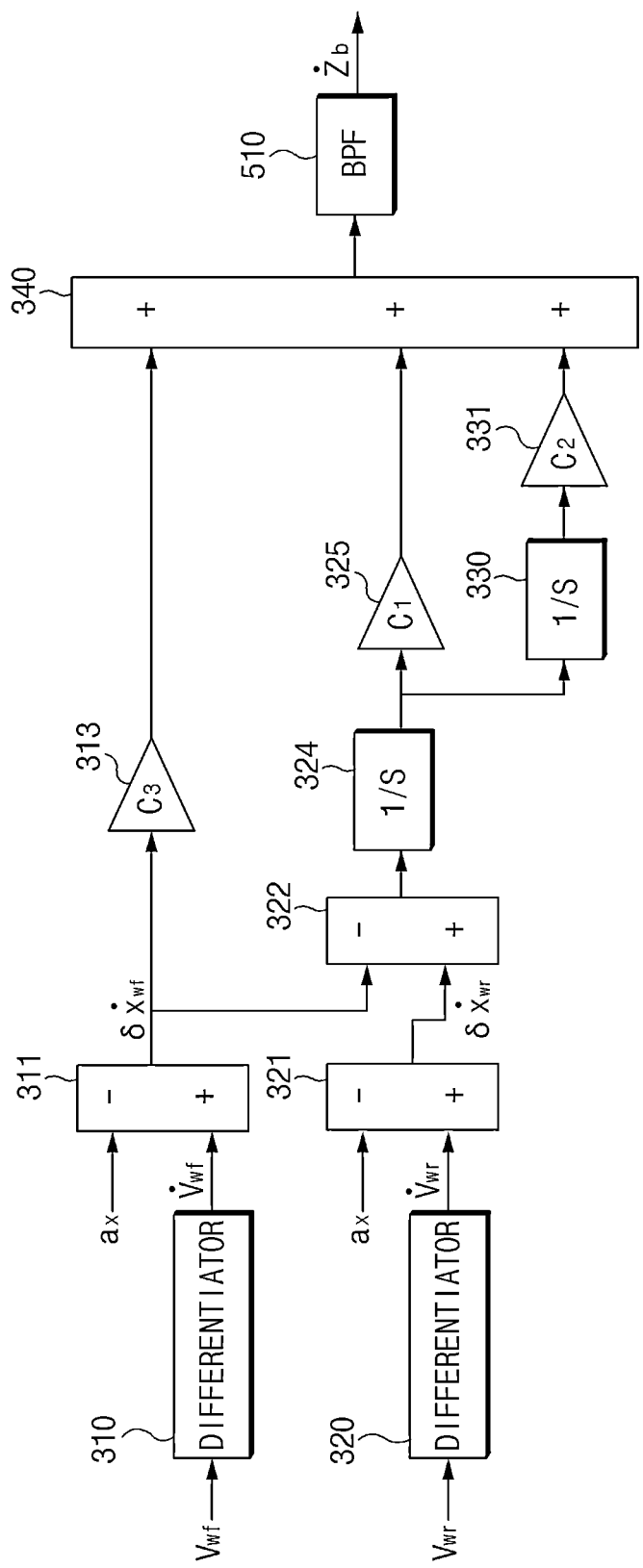
FIG. 5 is a second diagram illustrating a detailed configuration of a controller provided in an apparatus for estimating a bounce speed of a vehicle according to an embodiment of the present disclosure.

FIG. 5 is a second diagram illustrating a detailed configuration of a controller provided in an apparatus for estimating a bounce speed of a vehicle according to an embodiment of the present disclosure.

As shown in FIG. 5, the second detailed configuration of the controller 50 is basically the same as the first detailed configuration. However, the first BPF 312 and the second BPF 323 are omitted from the second detailed configuration, and a BPF 510 is added to a rear end of the summer 340. Accordingly, the BPF 510 may remove a noise and a DC offset included in the output (the bounce speed of the vehicle) of the summer 340.

Figure 6:
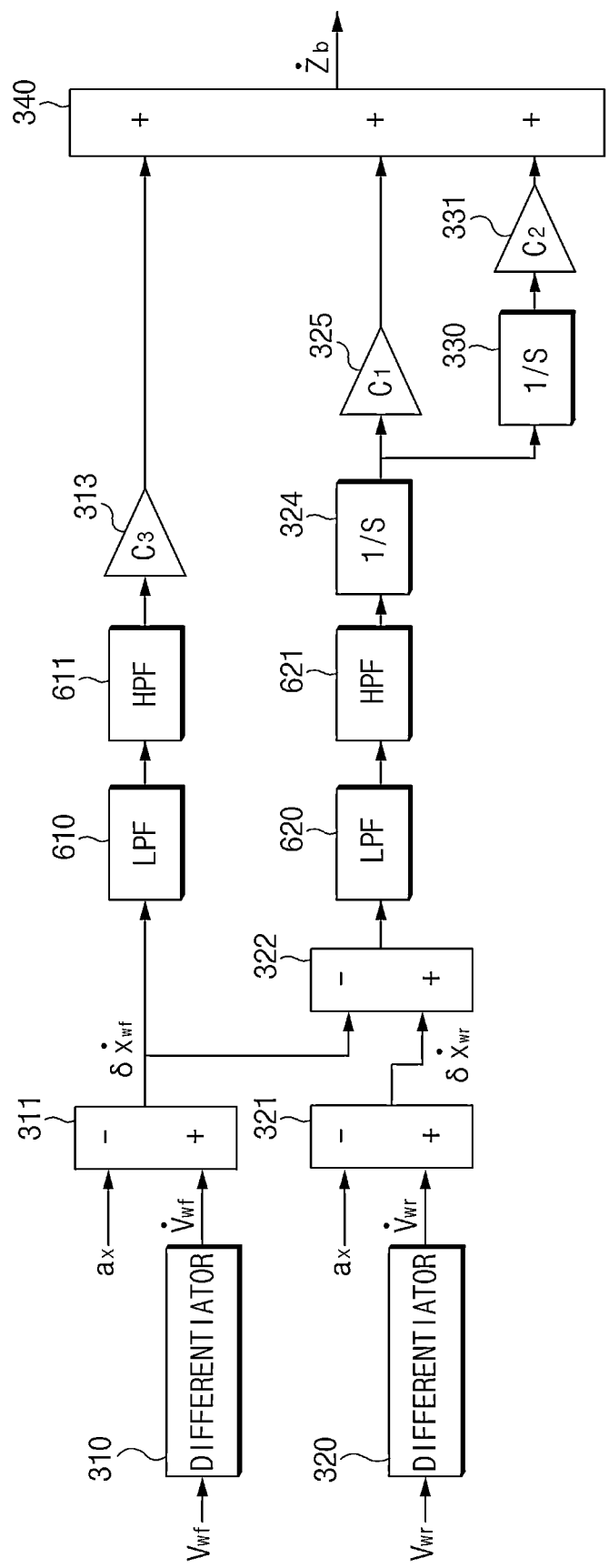
FIG. 6 is a third diagram illustrating a detailed configuration of a controller provided in an apparatus for estimating a bounce speed of a vehicle according to an embodiment of the present disclosure.

FIG. 6 is a third diagram illustrating a detailed configuration of a controller provided in an apparatus for estimating a bounce speed of a vehicle according to an embodiment of the present disclosure.

As shown in FIG. 6, the third detailed configuration of the controller 50 is basically the same as the first detailed configuration. However, the first BPF 312 is omitted from the third detailed configuration, and a first low pass filter (LPF) 610 and a first high pass filter (HPF) 611 are added. In addition, the second BPF 323 is omitted from the third detailed configuration, and a second LPF 620 and a second HPF 621 are added.

Therefore, the first LPF 610 may primarily remove the noise and DC offset included in the rate of change of the distance the center of the front wheel moves in the horizontal direction with respect to time. The first HPF 611 may secondarily remove the noise and DC offset from the output of the first LPF 610.

In addition, the second LPF 620 may primarily remove the noise and DC offset included in the result of subtracting the rate of change of the distance that the center of the front wheel moves in the horizontal direction with respect to time from the rate of change of the distance that the center of the rear wheel moves in the horizontal direction with respect to time. The second HPF 621 may secondarily remove the noise and DC offset from the output of the second LPF 620.

Figure 7:
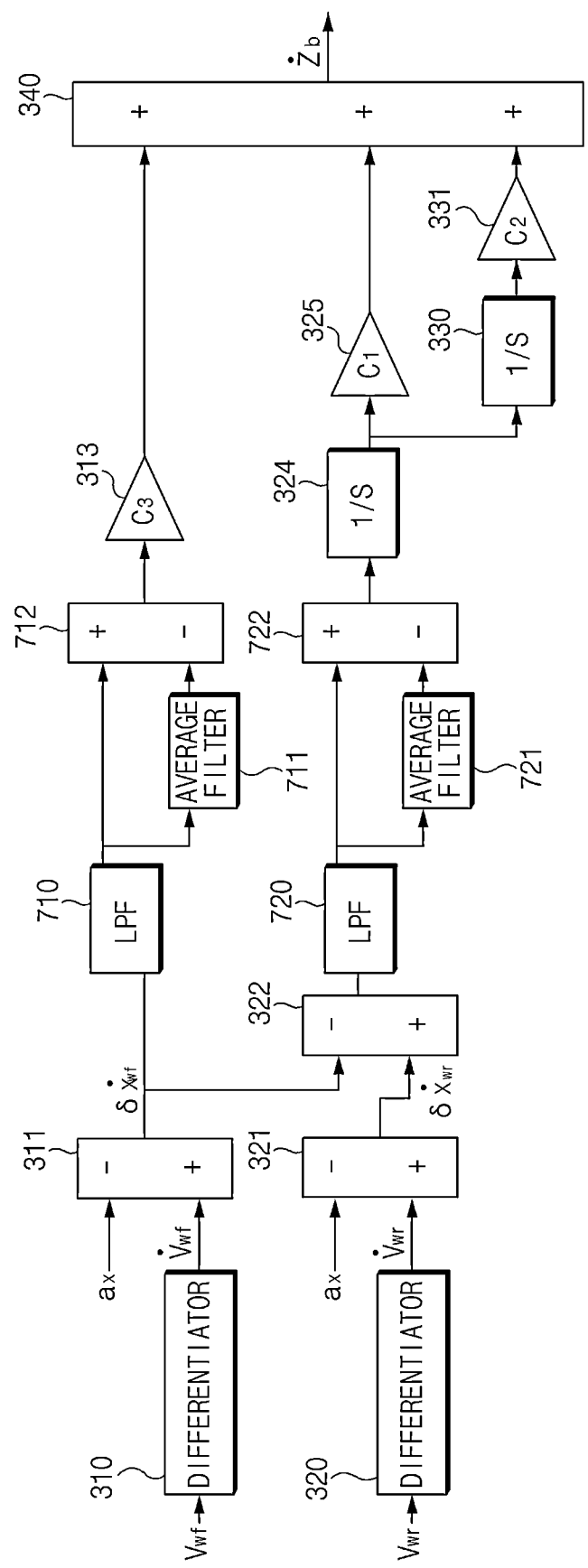
FIG. 7 is a fourth diagram illustrating a detailed configuration of a controller provided in an apparatus for estimating a bounce speed of a vehicle according to an embodiment of the present disclosure.

FIG. 7 is a fourth diagram illustrating a detailed configuration of a controller provided in an apparatus for estimating a bounce speed of a vehicle according to an embodiment of the present disclosure.

As shown in FIG. 7, the fourth detailed configuration of the controller 50 is basically the same as the first detailed configuration, but the first BPF 312 is omitted from the fourth detailed configuration. Furthermore, a first LPF 710, a first average filter 711, and a fourth subtractor 712 are added. In addition, the second BPF 323 is omitted and a second LPF 720, a second average filter 721, and a fifth subtractor 722 are added.

Therefore, the first LPF 710 may primarily remove the noise and DC offset included in the rate of change of the distance the center of the front wheel moves in the horizontal direction with respect to time. The first average filter 711 may output an average of the output of the first LPF 710, and the fourth subtractor 712 may subtract the average of the outputs of the first LPF 710 from the output of the first LPF 710.

In addition, the second LPF 720 may primarily remove the noise and DC offset included in the result of subtracting the rate of change of the distance that the center of the front wheel moves in the horizontal direction with respect to time from the rate of change of the distance that the center of the rear wheel moves in the horizontal direction with respect to time. The second average filter 721 may output an average of the outputs of the second LPF 720, and the fifth subtractor 722 may subtract the average of the outputs of the second LPF 720 from the output of the second LPF 720.

Figure 8:
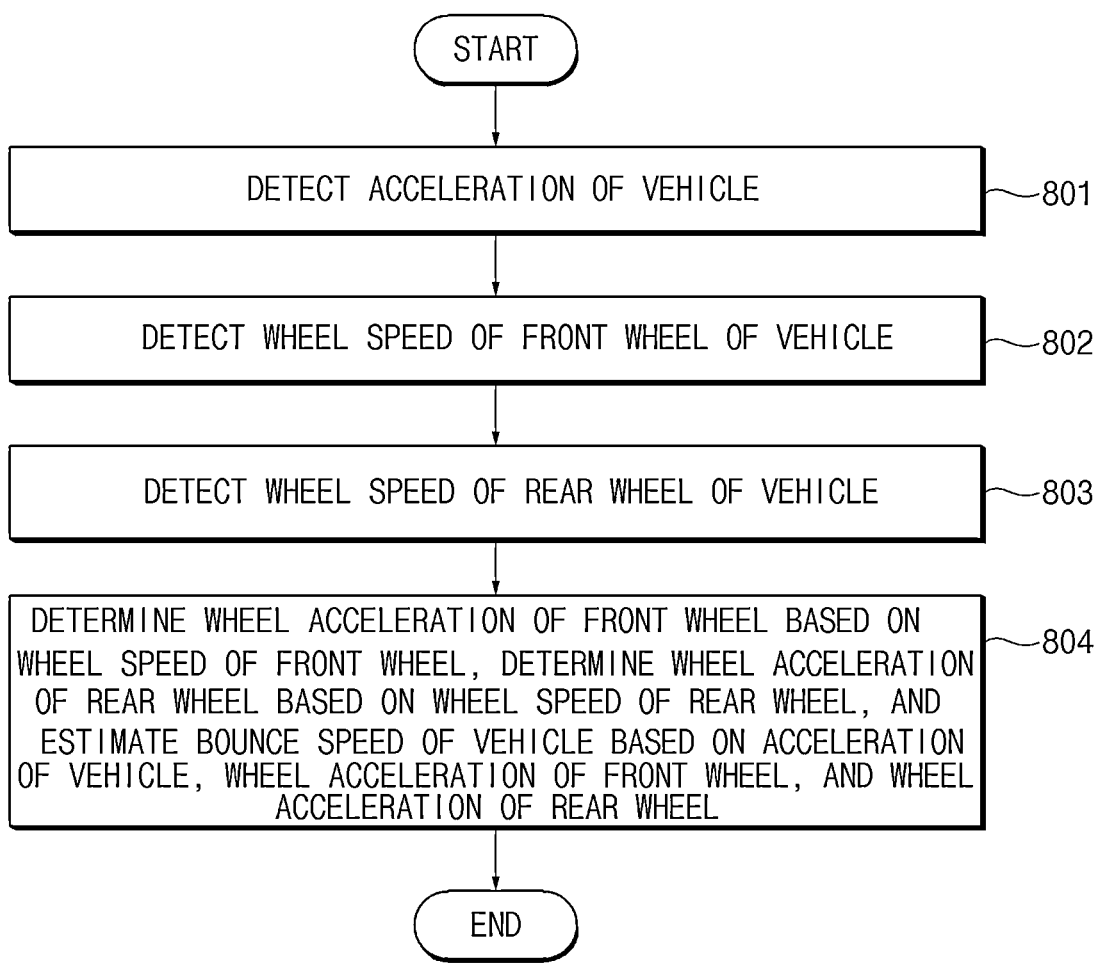
FIG. 8 is a flowchart illustrating a method for estimating a bounce speed of a vehicle according to an embodiment of the present disclosure.

FIG. 8 is a flowchart illustrating a method for estimating a bounce speed of a vehicle according to an embodiment of the present disclosure.

First, in 801, the acceleration sensor 20 detects the acceleration of the vehicle.

In 802, the front wheel speed sensor 30 detects the wheel speed of the front wheel of the vehicle.

In 803, the rear wheel speed sensor 40 detects the wheel speed of the rear wheel of the vehicle.

Thereafter, in 804, the controller 50 determines the wheel acceleration of the front wheel based on the wheel speed of the front wheel, and determines the wheel acceleration of the rear wheel based on the wheel speed of the rear wheel. Furthermore, the controller 50 estimates the bounce speed of the vehicle based on the acceleration of the vehicle, the wheel acceleration of the front wheel, and the wheel acceleration of the rear wheel. In this case, the controller 50 may estimate the bounce speed of the vehicle based on Equation 1. In other words, the controller 50 may determine the stroke change rate of the rear wheel suspension, and the stroke change amount of the rear wheel suspension. Furthermore, the controller 50 may determine the pitch speed of the vehicle based on the acceleration of the vehicle, the wheel acceleration of the front wheel, and the wheel acceleration of the rear wheel. Additionally, the controller 50 may estimate the bounce speed of the vehicle by summing the stroke change rate of the rear wheel suspension, the stroke change amount of the rear wheel suspension, and the pitch speed of the vehicle.

Figure 9:
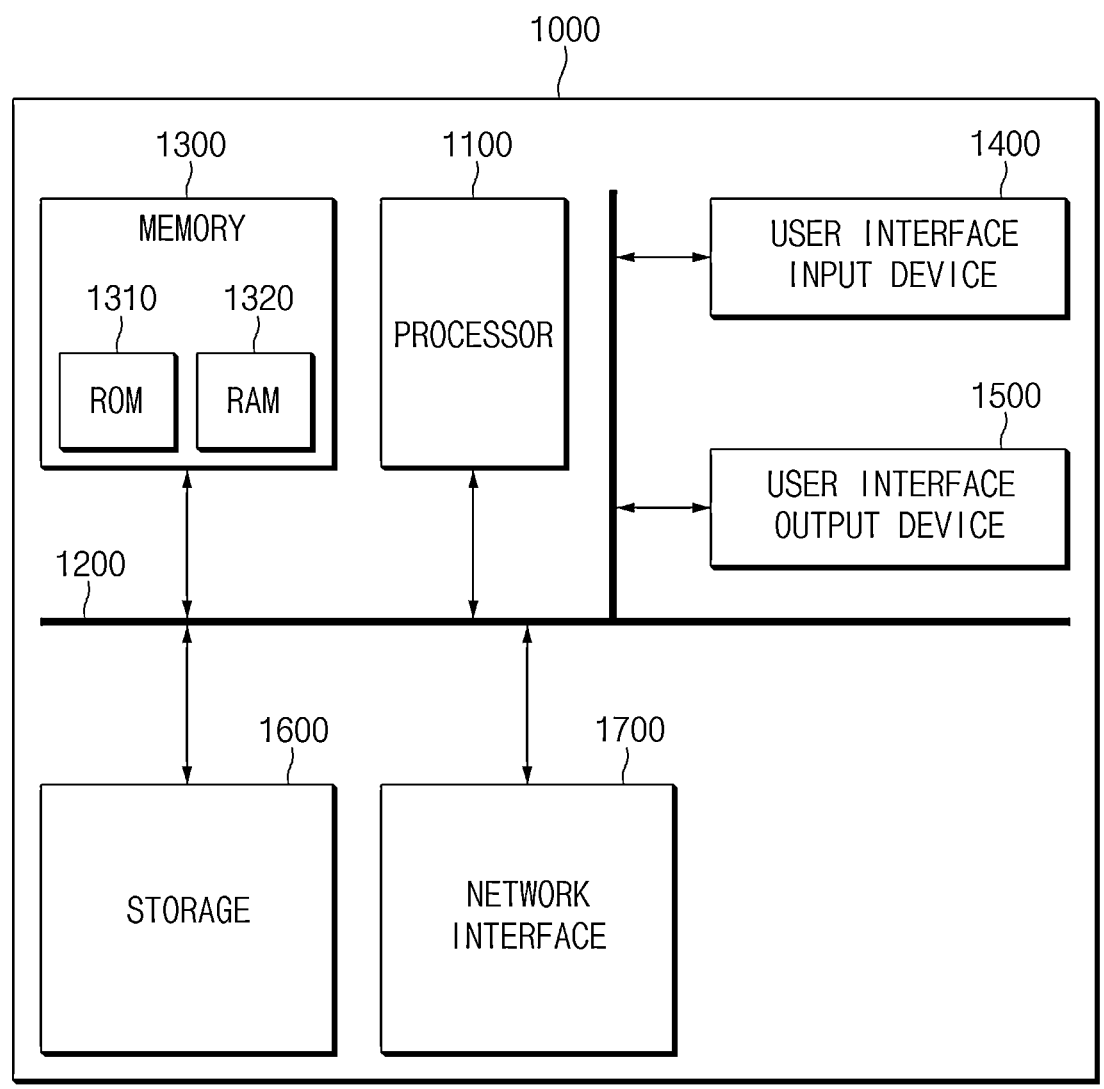
FIG. 9 is a block diagram illustrating a computing system for executing a method of estimating a bounce speed of a vehicle according to an embodiment of the present disclosure.

FIG. 9 is a block diagram illustrating a computing system for executing a method of estimating a bounce speed of a vehicle according to an embodiment of the present disclosure.

Referring to FIG. 9, a method of estimating a bounce speed of a vehicle according to an embodiment of the present disclosure described herein may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310, a RAM (Random. Access Memory) 1320, and the like.

Accordingly, the processes of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an EPROM, an EEPROM, a register, a hard disk, solid state drive (SSD), a detachable disk, or a CD-ROM. The storage medium is coupled to the processor 1100. The processor 1100 may read information from the storage medium and may write information in the storage medium. In another method, the storage medium may be integrated with the processor 1100. The processor and the storage medium may reside in an application-specific integrated circuit (ASIC). The ASIC may reside in a user terminal. In another method, the processor and the storage medium may reside in the user terminal as an individual component.

As described herein, according to the embodiments of the present disclosure, the apparatus and method for estimating a bounce speed of a vehicle are capable of measuring wheel speeds of the front and rear wheels and an acceleration of the vehicle by using wheel speed sensors and acceleration sensors provided in the vehicle. Furthermore, the apparatus and method for estimating a bounce speed of a vehicle are capable of determining the wheel acceleration of the front wheel based on the wheel speed of the front wheel, determining the wheel acceleration of the rear wheel based on the wheel speed of the rear wheel, and estimating the bounce speed of the vehicle. The bounce speed of the vehicle is estimated based on the wheel acceleration of the front wheel, the wheel acceleration of the rear wheel, and the acceleration of the vehicle. Thus, it is possible to estimate the bounce speed of the vehicle without additionally equipping the vehicle with a vertical direction acceleration sensor and a suspension stroke sensor (i.e., a height sensor).

Although embodiments of the present disclosure have been described for illustrative purposes, those having ordinary skill in the art should appreciate that various modifications, additions, and substitutions are possible without departing from the scope and spirit of the disclosure.

Therefore, the embodiments disclosed in the present disclosure are provided for the sake of descriptions, not limiting the technical concepts of the present disclosure. It should be understood that such embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for estimating a bounce speed of a vehicle, the apparatus comprising:
   an acceleration sensor configured to detect an acceleration of the vehicle;
   a front wheel speed sensor configured to detect a wheel speed of a front wheel of the vehicle;
   a rear wheel speed sensor configured to detect a wheel speed of a rear wheel of the vehicle; and
   a controller configured to:
     determine a wheel acceleration of the front wheel based on the wheel speed of the front wheel;
     determine a wheel acceleration of the rear wheel based on the wheel speed of the rear wheel; and
     estimate the bounce speed of the vehicle based on the acceleration of the vehicle, the wheel acceleration of the front wheel, and the wheel acceleration of the rear wheel.

2. The apparatus of claim 1, wherein the controller is further configured to:
   determine a stroke change rate of a rear wheel suspension, a stroke change amount of the rear wheel suspension, and a pitch speed of the vehicle based on the acceleration of the vehicle, the wheel acceleration of the front wheel, and the wheel acceleration of the rear wheel; and
   estimate the bounce speed of the vehicle by summing the stroke change rate of the rear wheel suspension, the stroke change amount of the rear wheel suspension, and the pitch speed of the vehicle.

3. The apparatus of claim 1, wherein the controller is further configured to estimate the bounce speed of the vehicle when the vehicle moves over a speed bump.

4. The apparatus of claim 1, wherein the controller includes:
   a first differentiator configured to differentiate the front wheel speed from the front wheel speed sensor to output the wheel acceleration of the front wheel;
   a first subtractor configured to subtract the acceleration of the vehicle from the wheel acceleration of the front wheel to output a rate of change of a distance a center of the front wheel moves in a horizontal direction with respect to time;
   a first multiplier configured to multiply an output of the first subtractor by a first constant;
   a second differentiator configured to differentiate the wheel speed of the rear wheel from the rear wheel speed sensor to output the wheel acceleration of the rear wheel;
   a second subtractor configured to subtract the acceleration of the vehicle from the wheel acceleration of the rear wheel to output a rate of change of a distance a center of the rear wheel moves in the horizontal direction with respect to time;
   a third subtractor configured to subtract the rate of change of the distance the center of the front wheel moves in the horizontal direction with respect to time from the rate of change of the distance the center of the rear wheel moves in the horizontal direction with respect to time;
   a first integrator configured to integrate an output of the third subtractor with respect to time;
   a second multiplier configured to multiply an output of the first integrator by a second constant;
   a second integrator configured to integrate an output of the first integrator again with respect to time;
   a third multiplier configured to multiply an output of the second integrator by a third constant; and
   a summer configured to sum an output of the first multiplier, an output of the second multiplier and an output of the third multiplier.

5. The apparatus of claim 4, wherein the controller further includes:
   a first band pass filter (BPF) located between the first subtractor and the first multiplier to remove a noise and a DC offset included in the output of the first subtractor; and
   a second BPF located between the third subtractor and the first integrator to remove a noise and a DC offset included in the output of the third subtractor.

6. The apparatus of claim 4, wherein the controller further includes:
   a band pass filter (BPF) configured to remove a noise and a DC offset included in an output of the summer.

7. The apparatus of claim 4, wherein the controller further includes:
   a first low pass filter (LPF) configured to primarily remove a noise and a DC offset included in the output of the first subtractor;
   a high pass filter (HPF) configured to secondarily remove a noise and a DC offset included in an output of the first LPF;
   a second LPF configured to primarily remove a noise and a DC offset included in the output of the third subtractor; and
   an HPF configured to secondarily remove a noise and a DC offset included in an output of the second LPF.

8. The apparatus of claim 4, wherein the controller further includes:
- a first low pass filter (LPF) configured to primarily remove a noise and a DC offset included in the output of the first subtractor;
- a first average filter configured to output an average of outputs of the first LPF;
- a fourth subtractor configured to subtract an output of the first average filter from an output of the first LPF;
- a second LPF configured to primarily remove a noise and a DC offset included in the output of the third subtractor;
- a second average filter configured to output an average of outputs of the second LPF; and
- a fifth subtractor configured to subtract an output of the second average filter from an output of the second LPF.

9. A method of estimating a bounce speed of a vehicle, the method comprising:
- detecting, by an acceleration sensor, an acceleration of the vehicle;
- detecting, by a front wheel speed sensor, a wheel speed of a front wheel of the vehicle;
- detecting, by a rear wheel speed sensor, a wheel speed of a rear wheel of the vehicle; and
- determining, by a controller, a wheel acceleration of the front wheel based on the wheel speed of the front wheel, determining a wheel acceleration of the rear wheel based on the wheel speed of the rear wheel, and estimating the bounce speed of the vehicle based on the acceleration of the vehicle, the wheel acceleration of the front wheel, and the wheel acceleration of the rear wheel.

10. The method of claim 9, wherein estimating the bounce speed includes:
- determining a stroke change rate of a rear wheel suspension, a stroke change amount of the rear wheel suspension, and a pitch speed of the vehicle based on the acceleration of the vehicle, the wheel acceleration of the front wheel and the wheel acceleration of the rear wheel; and
- estimating the bounce speed of the vehicle by summing the stroke change rate of the rear wheel suspension, the stroke change amount of the rear wheel suspension and the pitch speed of the vehicle.

11. The method of claim 9, wherein estimating the bounce speed further includes:
- initiating an estimate of the bounce speed of the vehicle when the vehicle moves over a speed bump.

12. The method of claim 9, wherein estimating the bounce speed further includes:
- differentiating, by a first differentiator, the front wheel speed from the front wheel speed sensor to output the wheel acceleration of the front wheel;
- subtracting, by a first subtractor, the acceleration of the vehicle from the wheel acceleration of the front wheel to output a rate of change of a distance a center of the front wheel moves in a horizontal direction with respect to time;
- multiplying, by a first multiplier, an output of the first subtractor by a first constant;
- differentiating, by a second differentiator, the wheel speed of the rear wheel from the rear wheel speed sensor to output the wheel acceleration of the rear wheel;
- subtracting, by a second subtractor, the acceleration of the vehicle from the wheel acceleration of the rear wheel to output a rate of change of a distance a center of the rear wheel moves in the horizontal direction with respect to time;
- subtracting, by a third subtractor, the rate of change of the distance the center of the front wheel moves in the horizontal direction with respect to time from the rate of change of the distance the center of the rear wheel moves in the horizontal direction with respect to time;
- integrating, by a first integrator, an output of the third subtractor with respect to time;
- multiplying, by a second multiplier, an output of the first integrator by a second constant;
- integrating, by a second integrator, an output of the first integrator again with respect to time;
- multiplying, by a third multiplier, an output of the second integrator by a third constant; and
- summing, by a summer, an output of the first multiplier, an output of the second multiplier and an output of the third multiplier.

13. The method of claim 12, wherein estimating the bounce speed further includes:
- removing, by a first band pass filter (BPF), a noise and a DC offset included in the output of the first subtractor; and
- removing, by a second BPF, a noise and a DC offset included in the output of the third subtractor.

14. The method of claim 12, wherein estimating the bounce speed further includes:
- removing, by a band pass filter (BPF), a noise and a DC offset included in an output of the summer.

15. The method of claim 12, wherein estimating the bounce speed further includes:
- primarily removing, by a first low pass filter (LPF), a noise and a DC offset included in the output of the first subtractor;
- secondarily removing, by a first high pass filter (HPF), a noise and a DC offset included in an output of the first LPF;
- primarily removing, by a second LPF, a noise and a DC offset included in the output of the third subtractor; and
- secondarily removing, by a second HPF, a noise and a DC offset included in an output of the second LPF.

16. The method of claim 12, wherein estimating the bounce speed further includes:
- primarily removing, by a first low pass filter (LPF), a noise and a DC offset included in the output of the first subtractor;
- outputting, by a first average filter, an average of outputs of the first LPF;
- subtracting, by a fourth subtractor, an output of the first average filter from an output of the first LPF;
- primarily removing, by a second LPF, a noise and a DC offset included in the output of the third subtractor;
- outputting, by a second average filter, an average of outputs of the second LPF; and
- subtracting, by a fifth subtractor, an output of the second average filter from an output of the second LPF.

* * * * *